Figure 1:
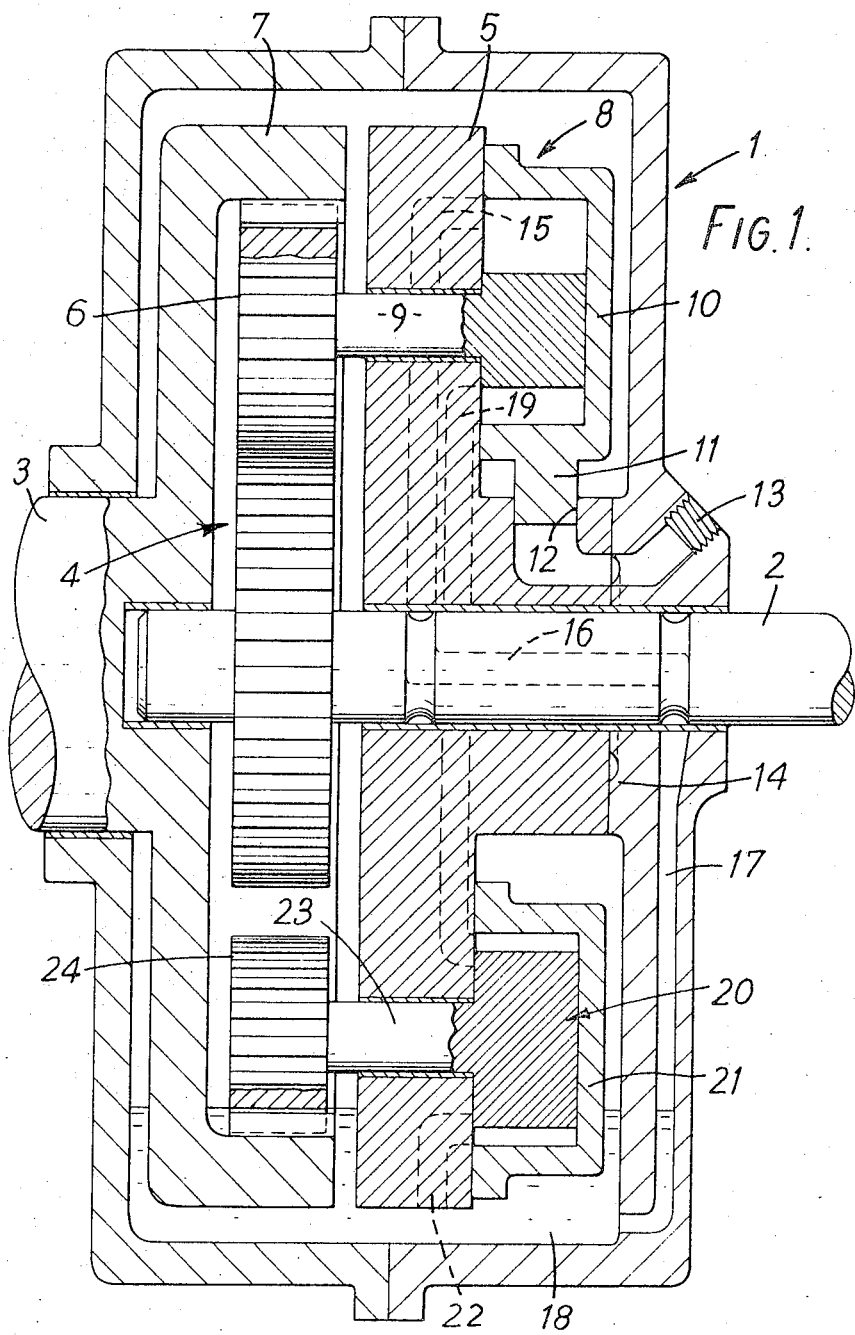

United States Patent [19]
Leeson

[11] 3,852,998
[45] Dec. 10, 1974

[54] SPEED CHANGING MECHANISMS

[76] Inventor: Patrick George Leeson, 20 Patch Ln., Bramhall, Stockport, England

[22] Filed: Jan. 17, 1973

[21] Appl. No.: 324,406

[30] Foreign Application Priority Data
Jan. 22, 1972  Great Britain ...................... 3126/72

[52] U.S. Cl. .......................... 74/63, 74/687, 74/774, 74/805
[51] Int. Cl. ............................................. F16h 25/14
[58] Field of Search ................ 74/687, 805, 63, 774

[56] References Cited
UNITED STATES PATENTS

| | | |
|---|---|---|
| 2,573,472 | 10/1951 | Martin .............................. 74/687 X |
| 2,692,513 | 10/1954 | Hattan ................................. 74/687 |
| 2,750,812 | 6/1956 | Mirone ................................. 74/686 |
| 2,833,160 | 5/1958 | Morgan................................. 74/687 |
| 2,851,908 | 9/1958 | Nakamura ......................... 74/687 X |
| 2,907,230 | 10/1959 | Kollmann.............................. 74/687 |
| 3,404,584 | 10/1968 | Trautmann ........................... 74/687 |

Primary Examiner—Samuel Scott
Assistant Examiner—John Reep
Attorney, Agent, or Firm—Larson, Taylor and Hinds

[57] ABSTRACT

Speed changing mechanism having a rotary input member, a rotary output member and an intermediate member provided with means for transmitting drive between the input and output members. Intermediate member is rotatable and means are provided to drive member in rotation and so vary the transmission ratio. Hydraulic drive means are preferably employed.

5 Claims, 6 Drawing Figures

SPEED CHANGING MECHANISMS

This invention relates to speed changing mechanisms of the kind having three principal members, viz. a rotary input member, a rotary output member and an intermediate member which is provided with means for transmitting drive between the input and output members. Examples of mechanisms of this kind are epicyclic gears or cam-actuated speed changing mechanisms, for example, as described and claimed in British Pat. No. 1,199,257.

A mechanism of the kind defined in the preceding paragraph will hereinafter be referred to as 'of the kind concerned.'

A mechanism of the kind concerned is normally used as a fixed-ratio unit, the said intermediate member carrying the drive-transmitting means being fixed to or integral with a casing in which the mechanism is housed. It has, however, been proposed to adapt such a mechanism for variable speed transmission by driving the intermediate member in rotation by means of a motor fixed to the casing of the mechanism, so as to speed up the output member relative to the input member. In some cases the motor is driven from the input member of the mechanism, so that, in effect, some of the input energy is 'shunted' to drive the drive transmitting means. A mechanism which operates in this way is known as a 'shunt-type' speed changing mechanism.

It will be appreciated that the intermediate member must be driven up to the full speed of the input if the speed changing mechanism is to be capable of a range from infinity down to one to one, and faster than the input if the mechanism is to act as a speed increaser. Thus the motor used to drive said member, because it is fixed to a static casing, is required to operate at its fastest capability when the reduction is approaching its lowest ratio. In most applications and certainly in speed changing mechanisms for vehicles this condition is the reverse of the desirable. Nevertheless a number of arrangements of this nature have appeared in technical literature, wherein the planet gear carrier of an epicyclic gear is driven from a fixed displacement hydraulic motor fixed to a static casing.

It is an object of the invention to avoid this disadvantage of conventional speed-changing mechanisms. A further aim is to provide an infinitely-variable speed changing mechanism which is of simplified design and construction compared with existing mechanism.

According to the invention there is provided a speed-changing mechanism of the kind concerned, wherein the said intermediate member is rotatable relative to the input and output members, and wherein there is provided, on at least one of the said principal members of the mechanism, means arranged to drive the intermediate member in rotation at a controlled rate so as to vary the speed of the output member for a given input speed and hence the transmission ratio between the input and output members of the mechanism.

It will be appreciated that a speed changing mechanism of this form avoids the problems associated with a static motor mounted on the casing of the mechanism. Moreover, the speed and work required from the drive means is reduced compared with conventional mechanism.

Although there is no limitation in this respect, the speed changing mechanism provided by the invention has been designed primarily for automotive applications, e.g., as a car or lorry gearbox. Thus, as automotive gearboxes (as well as many other speed changing mechanisms) are required to work at or near to 1:1 ratio for a large part of their lives, the mechanism provided by the invention is particularly suitable because the relative speeds between the three principal members of the mechanism approach zero as the transmission approaches 1:1. In other words progressively less work is required of the 'shunt' part of the mechanism as the 1:1 ratio is approached.

Preferably, the drive means of the mechanism are arranged to drive between the output member and the intermediate member of the mechanism as the range of relative speeds which must be accommodated is at a minimum with this arrangement.

In any event, the drive means themselves may be mechanical, hydraulic or electrical in operation.

The mechanical components of the mechanism to which the drive means are applied may, as explained above, be constituted by an epicyclic gear or by a cam-actuated speed changing mechanism, for example, as described in U.S. Pat. No. 3,765,253. Although hydraulic drive means may be applied to both types of mechanism, they are particularly suitable in the case of a cam-actuated speed changing mechanism.

Where hydraulic drive means are employed, they may be driven by a variable-delivery pump itself driven either directly or indirectly from the input member of the mechanism.

However, a number of difficulties arise with a system of this form in that the volume of oil which has to be pumped necessitates large oil passageways, which are difficult to accommodate. Moreover a full, closed circulating system (including a reservoir, filter, pump and motor circuits) is unavoidable with a rotary pump giving a continuous supply. As will be appreciated, it may be difficult to accommodate all these parts in the mechanism.

To avoid these problems, the preferred approach is to use a mechanism constructed in accordance with U.S. Pat. No. 3,765,253, in which the linear motion of one or more rolling body units in the mechanism may be employed to pump hydraulic fluid to an appropriate form of drive. As the rolling body units reciprocate in the mechanism in such a construction, the hydraulic supply will, of course, be of a pulsating nature. This is an advantage in that the oil is pumped backwards and forwards so that no full circulation system is needed.

Variation in the rate of flow of the hydraulic oil can be achieved by an appropriate form of control means in the circuit, for varying the pressure of the oil.

In order that the invention may be more clearly understood and readily carried into practice, reference will now be made to the accompanying drawings which illustrate various forms of speed changing mechanisms constructed in accordance with the invention.

Figure 2:
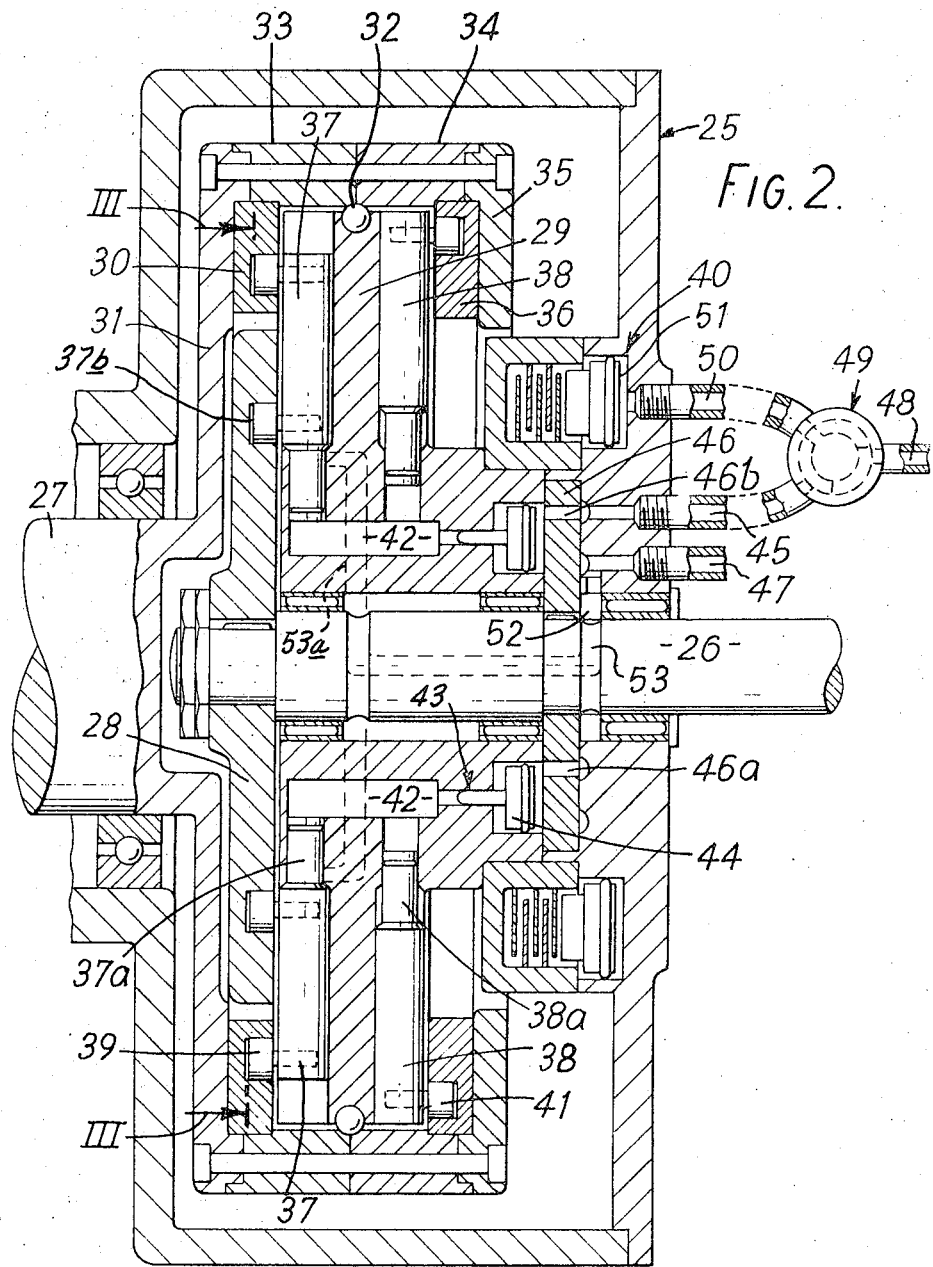
Figure 3:
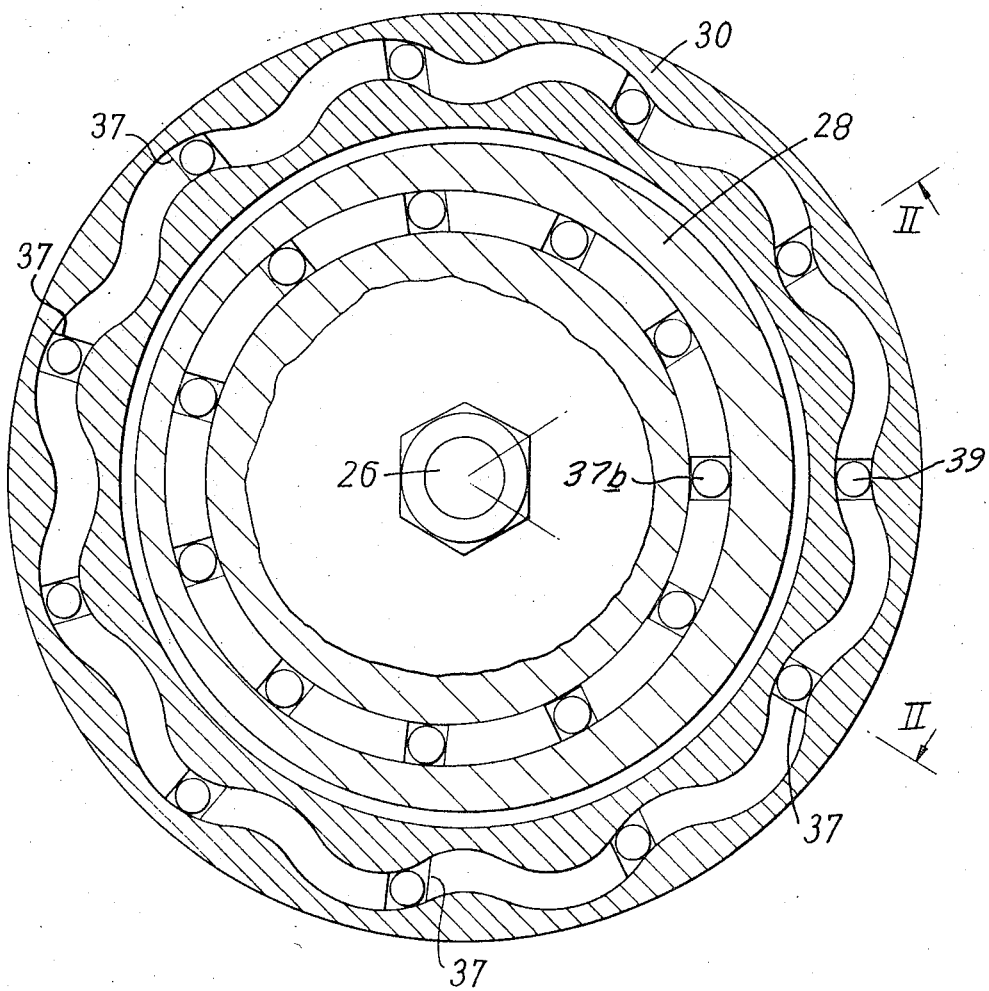
Figure 4A:
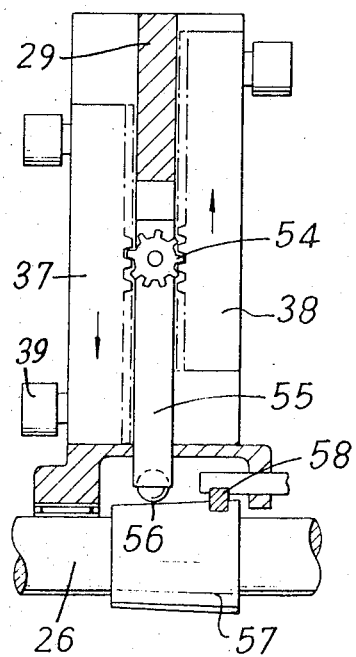
Figure 4B:
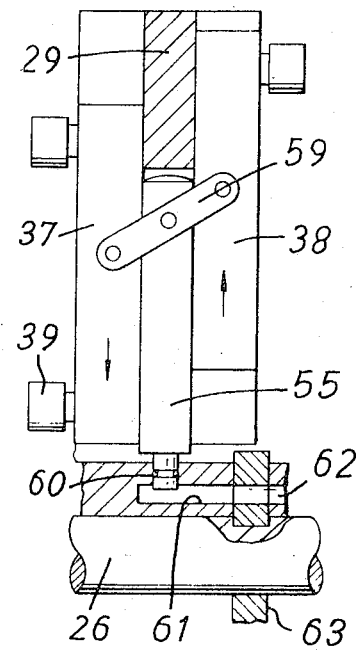
Figure 4C:
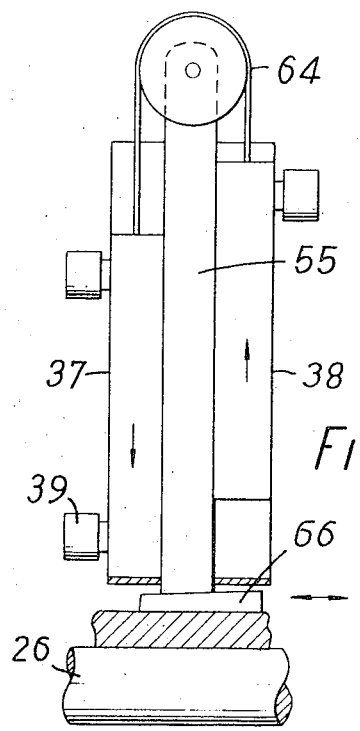

In the drawings:

FIG. 1 is a longitudinal sectional view of an epicyclic-type speed changing mechanism in accordance with a first embodiment of the invention, FIGS. 2 and 3 are longitudinal and transverse sectional views respectively of a cam-actuated speed changing mechanism in accordance with a second embodiment of the invention, FIG. 2 being taken on line II — II of FIG. 3 and FIG. 3 on line III — III of FIG. 3, and FIG. 4 comprises three views denoted a, b and c, which show further alternatives.

Reference will first be made to FIG. 1 of the drawings.

The mechanism shown in this view is housed in a casing 1 and has an input shaft 2 at one end and an output shaft 3 at its opposite end. The three principal members of the mechanism are: a sun wheel 4 fixed to input shaft 2; a planet gear carrier 5 carrying a set of planet gears 6 which mesh with sun wheel 4; and an internally toothed annular gear 7 with which the planet gears also mesh and which is carried by the output shaft 3.

All three principal members are free to rotate within casing 1. Thus, input shaft 2 rotates in bearings in the casing at its outer end, and in the annular gear 7 at its opposite end. Carrier 5 rotates on the input shaft 2 and the annular gear 7 rotates in bearings set in casing 1.

The mechanism also includes a variable-delivery vane pump 8 the vane assembly of which is connected by a common shaft 9 to one of the planet gears 6. Pump 8 has a casing 10 which is slidably mounted on carrier 5 and can be moved away from the axis of the mechanism by means of a piston 11 carried by the casing and received in a cylinder 12 in carrier 5. A hydraulic oil inlet 13 is provided in casing 1 and communicates with cylinder 12 at appropriate times through a collector ring 14. Thus, the delivery rate of the vane pump 8 can be varied by varying the pressure of the oil supplied through inlet 13. In the absence of oil pressure through inlet 13, casing 10 is returned to a concentric position with respect to the vane of the pump by spring means (not shown).

Vane pump 8 draws its supply of oil through a passage 15 in carrier 5, a passage 16 in the centre of the rotating input shaft 2 and a passage 17 in the casing 1, which communicates with a sump 18. The arrangement is such that all these passages are interconnected at all times. The output of the vane pump 8 is fed, through a passage 19 in carrier 5 to the input side of a fixed displacement gear motor 20, the casing 21 of which is fixed to the carrier 5. The exhaust from the gear motor 20 travels to the sump 18 via a passage 22.

The rotor of the gear motor 20 is mounted on one end of a shaft 23, the opposite end of which carries a spur gear 24 arranged in mesh with annular gear 7. Thus the planet gear 6 and the spur gear 24 both run on shafts which rotate within bearings set in the carrier 5, but the teeth of each planet wheel 6 engage with the tooth on the sun wheel 4 and the annular gear 7, whereas the teeth on the spur gear 24 engage only with the teeth on gear 7.

It will be appreciated that in this arrangement the carrier 5 is the free-wheeling member referred to above and the annular gear 7 the output member. This arrangement is not however, limiting since the annular gear can be used as the free-wheeling member. Moreover, it should be understood that it is possible to use differential-type mechanisms in the invention instead of pure epicyclic mechanisms, since the necessary three principal components perform similar functions in both types.

In any event, when the mechanism being described is in operation, resistance to the output member is usually offered, for example, in a standing vehicle, so that the carrier 5 rotates freely in the same direction as the input shaft 2. At this time, the casing 10 of vane pump 8 is in a concentric position and therefore the pump is not operating. However, as soon as oil under pressure is introduced to the cylinder 12 via the inlet 13, the casing 10 is moved into an eccentric position vis-a-vis the vane rotor of the pump 8 and pumping commences. The output from pump 8 drives the gear pump 20 and hence the spur gear 24, which in turn drives the free wheeling member 5 in the same direction as the shaft 2. The relative difference in velocities between the carrier 5 and the shaft 2 is thereby reduced. Because of the mechanical linkage between all three principal members the annular gear 7 must also rotate in the same direction as the input shaft 2.

Subject to certain constant factors, the torque multiplication obtained with the mechanism is in proportion to the inverse of the reduction ratio, which latter can be brought up to a 1:1 ratio (subject to small hydraulic leakage) according to the pressure of the control fluid fed through the inlet port 13.

The control means for supplying oil to port 13 can be extremely simple; for example, a pressure control valve attached to the accelerator of a vehicle may be used. The natural propensity of the mechanism to equate input and output horsepower can be overridden merely by lowering the pressure of the control fluid in appropriate fashion.

Whilst a number of practical difficulties are encountered in a mechanism of the epicyclic or differential type constructed according to the invention (see above), the embodiment of FIG. 1 serves to illustrate the basic features of the invention.

FIGS. 2 and 3 show a preferred form of the invention, in which a cam-actuated type speed changing mechanism is used. The mechanical features of this mechanism are basically as described in U.S. Pat. No. 3,765,253.

In the embodiment of FIGS. 2 and 3, the casing of the mechanism is designated 25 and the input and output shafts 26 and 27 respectively. The three principal members of the mechanism comprise: a cam 28 mounted on the inner end of input shaft 26; a cage 29 (constituting the free wheeling member of the mechanism); and a cam ring 30 connected to the output shaft 27 through a so-called 'ratio plate' 31.

These three principal members are all rotatably mounted in the casing, the input member comprising shaft 26 and cam 28 being mounted through needle bearings set in casing 25, and two further needle bearings being provided to enable the shaft to rotate within and relative to cage 29. The cage itself is free to rotate but is positioned by balls 32 which roll in a track defined between the periphery of the cage and two extensions 33, 34 on the ratio plate 31. Extensions 33, 34 are bolted to plate 31 together with a capping ring 35. This capping ring carries a cam ring 36 formed with a cam track (see later).

Cage 29 carries two sets of so-called 'roller bodies' 37, 38, each of which is slidable radially of the mechanism. The roller bodies 37 adjacent cam 28 each have a pair of cam followers 37b, 39 which run respectively in a cam track in cam 28 and in a cam track in ring 30. Assuming that cage 29 is stationary therefore, rotary motion applied to input shaft 26 will cause linear motion of the roller bodies 37 and this linear motion will in turn be converted by cam ring 30 into rotary motion of the output shaft 27. Thus, the mechanism will operate as a straight-forward reduction gear.

In fact, the mechanical arrangement is such that the ratio plate 31 will rotate in the opposite direction to shaft 26 if cage 29 is stationary. In other words, the mechanism provides a reverse gear in this condition. Assuming the mechanism is to be used in a vehicle, if the reverse gear is required to be say a 12:1 ratio, thirteen roller bodies 37 will be provided, cam ring 36 will have twelve recesses and cam 28 one lobe.

In the illustrated mechanism, a multi-plate brake 40 is provided to hold cage 29 stationary when a reverse gear is required as will be more fully explained later.

The other set of roller bodies 38 in cage 29 each carry a cam follower 41 engaged in the cam track in cam ring 36. When the mechanism is operating in its infinitely variable mode for forward drive, cage 29 is free to rotate and the linear, radial motion of the roller bodies 37 is transmitted (as will be explained) to the roller bodies 38. The linear motion of bodies 38 is then converted into radial motion by cam ring 36 so that cage 29 is driven.

Transmission of the radial motion of roller bodies 37 to the bodies 38 is effected as follows:

The roller bodies 37 carry at their inner ends, hydraulic pistons 37a which reciprocate in cylinders in the cage 29. A passageway 42 connects each of the said cylinders to a similar but opposed cylinder on the opposite side of the cage 29, which cylinder receives a piston 38a formed integrally with the relevant roller body 38. Each passageway 42 also communicates with a further cylinder and piston 43, the piston 43 being integral with much larger pistons 44. All the pistons 44 are operated by control fluid supplied to the mechanism through an inlet port 45 from external control means and each piston slides in a cylinder having access to the port via a valve plate 46 formed with bananashaped slots 46a, 46b. Similarly, the cylinders for pistons 44 have access to a low pressure exhaust port 47. The valve plate 46 is keyed to the input shaft 26 and thereby turns in concert with the cam 28 which is similarly keyed.

Control fluid at a medium pressure (around 60 to 100 p.s.i.) is directed to the inlet 48 of a rotary selector valve 49. In its central position, valve 49 allows no oil to flow. It can however be turned to direct oil to either the inlet 45 or to an inlet 50 to brake 40, but not to both at once. If directed to inlet 50 the oil operates the multiplate brake 40 by virtue of its expansion in the chamber 51. If directed to inlet 45, the oil passes through banana slot 46b in valve plate 46 and when the latter is positioned opposite any particular set of pistons 44 the oil is applied to the latter. This causes pressure to build up in the associated chambers 42, with the result that, as the corresponding roller bodies 37 move towards the axis of the mechanism, fluid is displaced by the pistons 37a through the chambers 42, to the cylinders containing the pistons 38a carried by bodies 38 thereby displacing the latter radially outwards. The linear motion of bodies 38 is converted into rotary motion by cam follower 41 and cam ring 36 causing the ratio plate assembly (31, 33, 34, 35) and output shaft 27 to rotate against the static resistance to the latter.

Manifestly, by varying the magnitude of the control pressure, the transmission ratio of the mechanism can be varied.

Instead of providing individual controls for the pistons 44 as described above, a single annular plate may replace the pistons for the purpose of pressurising the fluid at appropriate times, by a single control device, e.g., of a hydraulic or a mechanical type. In some cases, it might be necessary to key the plate to the input shaft 26 and to relieve a part of this plate to ensure proper control of the pressure in all the passageways.

Cam rings 30 and 36 are identical (the shape of ring 30 being shown in FIG. 3) but cam ring 36 is advantageously set a few degrees behind cam ring 30 to create a pressure build-up when both ratio plate 31 and cage 29 are rotating in the same forward direction.

It should be noted that exhaust oil coming out of the port 47 is kept at a small back pressure of around 5 to 10 lbs p.s.i. Consequently oil ejected by the piston 44, when the banana slot 46a is in position, can enter an exhaust passageway 52 and thence via a passageway 53 in the centre of the shaft 26 and a further passageway 53a in cage 29, finally enter the cylinder when piston 37a reaches near its Top Dead Centre (TDC). In this manner any leakages are made good in the action of the device.

The mechanism operates as follows:

When the valve 49 is in the central (neutral) position the line 45 is open to exhaust so any pressure that might build up in the chambers 42 is in fact dissipated by the movement of the control cylinder toward the input side. Thus no energy can be directed via the shunt mechanism due to the pumping action of the piston 37a and the cage 29 revolves backward freely at the fixed reduction ratio of the device (provided that there is some resistance to rotation of the output member 31).

Thus no drive reaction can be transmitted to the output member and the mechanism can be said to be in neutral.

If reverse is required, the valve 49 is turned so that the control fluid is directed into the port 50 and thence to the chamber 51 thereby operating the multiple plate clutch 40 which locks the cage 29 to the casing 25. The mechanism then acts as a straight reduction box with the output rotating in the opposite direction to the input.

If forward motion of the output is required, i.e., rotation in the same direction as the input, the valve 49 is turned to direct the pressurised control fluid entering by the line 48 towards the port 45 and thence to the banana slot 46b when the timing valve is in a suitable position (i.e., only when the piston 37a is moving toward the axis of the device). The oil (or other suitable control fluid) then exerts pressure on the piston 44 as described above, with the result that the ratio plate assembly and hence the output shaft rotate against the static resistance operating on the output shaft.

Thus the vehicle (assuming the mechanism is installed as a gearbox) is propelled forward and accelerated at a rate determined mostly by the energy transmitted by the shunt in the low gear ratio but less and less through the shunt as the vehicle gathers speed and the changing speed ratio comes nearer and nearer that 1:1 relationship. It will be appreciated that on the return stroke the banana slot 46a is open to the exhaust so that only a modest back pressure still operates on the the cylinder and pistons 44 so that the pressure drops right off in the chamber 42 and no power is transmitted to the piston 38a (receding from the axis) by the piston 37a (approaching the axis). Pressure applied on the return stroke will have the effect that the entire device tends to lock after changing up to 1:1 ratio. Obviously this can easily be arranged but the facility is not normally required.

In most vehicle applications it is important to keep the reduction ratio low in order to get full power from the engine; this is easily arranged by suitable control of the pressure in the line 48. Indeed a suitable relief valve in this line or line 45 can ensure that the acceleration of the vehicle is limited to safe amounts so that driving mechanisms are not damaged. It is also a simple matter to link two similar units on say a military drive with independent drive on two separate wheels. It is only necessary to link the lines 45 in order to ensure that the same amount of energy flows through both shunt mechanisms in order to equate the performance of the two devices and thereby avoiding the need for a differential.

The arrangement of FIGS. 2 and 3 can be considered as a single stroke arrangement since energy is only shunted during one stroke of the roller bodies 37 and not on the return stroke. At the cost of extra complication and weight it is possible to arrange for a twin stroke action whereby energy is shunted on both strokes. For example it is possible to provide pistons at the ends of the roller bodies opposite pistons 37a, 38a in order to duplicate the arrangement shown.

Apart from the above-noted advantages of the arrangement shown in FIGS. 2 and 3, production of the hydraulic parts can be facilitated by separating the cage 29 into two parts with the split line at the top of the cylinders in which the pistons 37a and 38a operate. Also looked at from a production viewpoint it will be appreciated that there are a great number of identical parts that facilitate cheap manufacture. Moreover, the mechanism can be readily adjusted in points of detail to suit different applications. For example, the cam ring 36 can be retarded behind its opposing cam ring 30 to increase the pressure in the chamber 42 and therefore the energy shunted. Similar timing adjustments can be made with the valve plate 46. More fundamentally the shape of the recesses in the cam tracks 30 and 36 and complimentary track in the cam 28 can be altered to give different strokes in the roller bodies, different acceleration characteristics, etc.

Additionally, for example, twin lobes in the cam 28 and a corresponding increase in the number of roller bodies to 14 will have the effect of halving the reduction ratio at reverse but double the pumping rate and affect a number of other characteristics in favour of a low speed primemover. Amongst other modifications, it is possible to eliminate the cam ring 36 and change the role of each alternate roller body 37 into that of a roller body 38 by removing the bottom roller 38 and ensuring that the piston 38a is at the opposite end of the roller body (i.e., the end farthest from the axis). By redisposing the interconnecting chamber 42 and other related components it is possible to construct a very much more compact unit that is lighter but only able to take about half the torque of the unit shown in FIGS. 2 and 3. The unit then must have a fixed timing since the adjustable timing previously referred to depended on the existence of the second cam ring 36.

In the commercial field, increasing vehicle sizes impose considerable loads on the wheel brakes. In this invention the shunt energy is directed to speed up the rotation of the free wheeling member of the mechanism and once this energy is no longer applied the member will tend to slow up and hence necessitate the engine to revolve much faster at a given road speed. Thus any for m of braking applied to the member, however light, will result in a much multiplied engine braking due to the friction at the much higher revolutions. A light application of the multiple plate clutch 40 will have this effect and suitably throttled oil pressure can readily be applied through the valve 49.

It has previously been mentioned that whilst the shunt mechanism is preferably hydraulic by nature, purely mechanical, mechanical/hydraulic and even electrical are all possible.

In electrically driven vehicles, for example, it is feasible to mount a generator in place of the vane pump 8 of the FIG. 1 arrangement and to connect the same to an electric motor in place of the gear motor 20.

FIG. 4, on the other hand, shows some mechanical forms of shunt mechanism:

In view a the reciprocating roller bodies 37 and 38 are shown with teeth cut on the back face which teeth engage with the teeth of a spur wheel 54 rotatably mounted on a slide block 55. The roller bodies and the block all slide radially within cage 29 (on which they are mounted), the latter being free to rotate around the input shaft.

At its end nearest the axis the slide 55 has a cut in which a ball 56 can roll and the ball is in contact with a cam 57. Cam 57 is splined to the input shaft 26 and thus rotates with it but can be slid along the splines in an axial direction by means of a mechanically actuated yoke 58.

Cam 57 is conical to a small degree and relieved on part of its circumference to a degree that varies over the length of the cam. In this way the energy transmitted by the spur gear wheel 54 can be varied by moving the cam along the axis of the input shaft 26 and therefore moving the pivot of the see-saw, so to speak, so that the amplitude of the energy pulse is varied.

In view b a lever arrangement is shown in which a lever 59 is pivoted on the slide block 55, and at its two ends, on the roller bodies 37 and 38 respectively. The result is virtually the same as the arrangement of a and could be controlled in the same way but is actually shown with a piston 60 operating within a cylinder in the cage 29 which has access to a chamber 61 and thence to an input line 62 via slots in a valve plate 63 which latter is keyed to the input shaft 26. It is believed that the operation of this device will be clear in view of its similarity to the FIG. 2 arrangement.

Finally diagram c shows an arrangement in which roller bodies 37 and 38 are connected, on their ends remote from the axis of the mechanism, by a flexible belt 64 running over a free wheeling pulley 65. The stud on which pulley 65 turns is fixed to the slide block 55, the stroke of the latter being restricted to a variable degree by a wedge 66. The wedge 66 is slidably fixed to the cage 29 being actuated by mechanical or hydraulic means (not shown).

I claim:

1. A speed changing mechanism of the kind comprising three principal members, namely a rotary input member formed with a cam track; a rotary output member formed with a recessed track having an array of identical track sections evenly spaced from one another and each including a recess, and an intermediate rotary member carrying an array of identical units each comprising one or more rolling bodies; and hydraulically operated drive means between the intermediate member and the output member for driving the latter relative to the intermediate member, and wherein the mechanism further comprises, on at least one of the said principal members of the mechanism, control means for rotating the intermediate member in rotation at a controlled rate so as to vary the speed of the output member for a given input speed and hence the transmission ratio between the input and output members of the mechanism, said control means comprising hydraulic fluid supply means comprising pistons carried by each of said rolling body units, the pistons being slidable in cylinders in the intermediate member as the rolling body units perform their linear motion, whereby a pulsating supply of hydraulic fluid is delivered to the drive means as the rolling body units reciprocate.

2. A mechanism according to claim 1, wherein the drive means comprise a second array of linearly-movable rolling body units carried by the intermediate member and arranged in contact with a second recessed track which is identical with the first and is carried by the output member, the rolling body units in said second array being linearly displaceable in cylinders in said intermediate member by the pulsating hydraulic fluid output from the first-mentioned rolling body units.

3. A mechanism according to claim 2, wherein the pressure of the pulsating supply of hydraulic fluid produced by each of the first-mentioned rolling body units is controlled by a piston arranged to restrict the volume of the passageway in which the fluid flows.

4. A mechanism according to claim 3, wherein the position of each piston and hence the pressure of the pulsating supply is determined by a control input of hydraulic fluid.

5. A mechanism according to claim 1, wherein braking means are provided to restrain the intermediate member against rotation at required times.

* * * * *